United States Patent
Sakai et al.

(10) Patent No.: US 9,069,538 B2
(45) Date of Patent: Jun. 30, 2015

(54) PREVENTING DARK CURRENT FLOW IN A MOBILE TERMINAL

(71) Applicant: SONY MOBILE COMMUNICATIONS INC., Minato-ku (JP)

(72) Inventors: Daisuke Sakai, Tokyo (JP); Kuniharu Suzuki, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 221 days.

(21) Appl. No.: 13/765,148

(22) Filed: Feb. 12, 2013

(65) Prior Publication Data

US 2013/0227312 A1    Aug. 29, 2013

Related U.S. Application Data

(60) Provisional application No. 61/604,947, filed on Feb. 29, 2012.

(51) Int. Cl.
G06F 1/26 (2006.01)
G06F 1/32 (2006.01)

(52) U.S. Cl.
CPC .............. *G06F 1/263* (2013.01); *G06F 1/3203* (2013.01)

(58) Field of Classification Search
CPC ............................ G06F 1/3206; H02J 7/0063
USPC .......................................... 320/135; 713/300
See application file for complete search history.

(56) References Cited

U.S. PATENT DOCUMENTS

| | | | | |
|---|---|---|---|---|
| 8,138,722 B2 * | 3/2012 | Wang et al. | ................... | 320/135 |
| 8,154,255 B2 * | 4/2012 | Wang et al. | ................... | 320/136 |
| 2013/0130749 A1 * | 5/2013 | Andersen et al. | .......... | 455/569.1 |
| 2014/0191590 A1 * | 7/2014 | Yanagidaira et al. | ......... | 307/130 |

FOREIGN PATENT DOCUMENTS

JP    07-296856    11/1998

* cited by examiner

*Primary Examiner* — Albert Wang
(74) *Attorney, Agent, or Firm* — Oblon, McClelland, Maier & Neustadt, L.L.P.

(57) ABSTRACT

An information processing apparatus including an internal battery device including a secondary battery; a load device configured to receive power from the secondary battery; a switch section disposed externally to the battery device and configured to generate a control signal for preventing dark current from flowing from the secondary battery to the load device; and a first switching element configured to cut off a power source path from the secondary battery to the load device based on the control signal generated by the switch section.

17 Claims, 13 Drawing Sheets

| DARK-CURRENT PROTECTION MODE | SWITCH SECTION 130 | FET 132 |
|---|---|---|
| ON (AT SHIPPING TIME, ETC.) | ON | OFF |
| OFF (AT USE START TIME, ETC.) | OFF | ON |

FIG. 3

| DARK-CURRENT PROTECTION MODE | SWITCH SECTION 130 | FET 132 |
|---|---|---|
| ON (AT SHIPPING TIME, ETC.) | ON | OFF |
| OFF (AT USE START TIME, ETC.) | OFF | ON |

FIG. 5

| DARK-CURRENT PROTECTION MODE | SWITCH SECTION 130 | FET 134 | FET 146, 147 |
|---|---|---|---|
| ON (AT SHIPPING TIME, ETC.) | ON | OFF | OFF |
| OFF (AT USE START TIME, ETC.) | OFF | ON | ON (NORMAL TIME) |

FIG. 8

| DARK-CURRENT PROTECTION MODE | SWITCH SECTION 130 | EN | FET 147 |
|---|---|---|---|
| ON (AT SHIPPING TIME, ETC.) | ON | Hi | OFF |
| OFF (AT USE START TIME, ETC.) | OFF | Lo | ON (NORMAL TIME) |

PREVENTING DARK CURRENT FLOW IN A MOBILE TERMINAL

CROSS REFERENCE TO RELATED APPLICATION

The present application claims the benefit of the earlier filing date of U.S. Provisional Patent Application Ser. No. 61/604,947 filed on Feb. 29, 2012, the entire contents of which is incorporated herein by reference.

BACKGROUND

1. Field of the Disclosure

The present disclosure relates to a mobile terminal having an internal battery device including a secondary battery.

2. Description of Related Art

To date, mobile terminals called smart phones have rapidly become widespread. A mobile terminal uses a rechargeable battery (secondary battery) as a power source.

In general, in an apparatus in which the user is allowed to exchange a battery, the apparatus is provided to the user in a state of the battery removed from a body of the apparatus at the time of factory shipment of the product.

Japanese Unexamined Patent Application Publication No. 7-296856 describes a technique for preventing a very little current called a dark current from flowing in an internal circuit in a battery device when the battery device is left as it is without being connected to a load device in an apparatus, such as a video camera including a detachable battery, etc. Specifically, the battery device is internally provided with a means for detecting a connection with a load device or a charging device, and a switch for cutting off the battery from the internal circuit in a detected state of being unconnected with the load device or the charging device.

Also, in a state in which a battery device is attached to a body of an apparatus, such as a mobile terminal, etc., the battery device is electrically connected to a load device, and thus it is noted that even in a power-off state, a dark current flows. Accordingly, if the mobile terminal is left as it is without being charged for a certain period, the battery device becomes an over-discharged state, and it becomes necessary to charge the battery device at the time of turning on the power again. Also, there is a disadvantage in that if the over-discharged state takes long, the battery greatly deteriorates to become unavailable for use, etc.

SUMMARY

Incidentally, some of mobile terminals, such as smart phones, etc., are models of mobile terminals having a structure in which a battery device is contained in a body of the terminal at a shipment stage, and a user is not allowed to exchange the battery device. In such a model, a mechanical structure of the battery device is simplified, and thus the mobile terminal has advantages in that the mobile terminal can be reduced in thickness, in weight, and in cost.

In a mobile terminal of such a model, a battery device is connected to a load device all the time, and a dark current flows to the load device while the power is turned off. Accordingly, after the shipment of the product, discharge of the battery continues to occur, which is caused by the dark current, at a warehouse and at a store until a user obtains the mobile terminal.

In reality, it is desirable to allow a user to use the product as soon as the user obtains the product without charging the product. Also, as described above, it is not desirable that an over-discharged state takes long, and thus the battery deteriorates.

The present disclosure has been made in such a background. The inventors of the disclosure has recognized necessity of preventing discharge of a battery caused by a dark current after factory shipment and in the case where the mobile terminal is not used for a relatively long period in a state of the mobile terminal including the battery.

According to one exemplary embodiment, the disclosure is directed to an information processing apparatus including an internal battery device including a secondary battery; a load device configured to receive power from the secondary battery; a switch section disposed externally to the battery device and configured to generate a control signal for preventing dark current from flowing from the secondary battery to the load device; and a first switching element configured to cut off a power source path from the secondary battery to the load device based on the control signal generated by the switch section.

BRIEF DESCRIPTION OF DRAWINGS

FIG. 3 is a diagram illustrating a summary of relationships between on/off of a dark-current prevention mode of the battery device illustrated in FIG. 2 and individual sections.

FIG. 5 is a diagram illustrating a summary of relationships between on/off of a dark-current prevention mode of the battery device illustrated in FIG. 4 and individual sections.

FIG. 8 is a diagram illustrating a summary of relationships between on/off of a dark-current prevention mode of the battery device illustrated in FIG. 6 and individual sections.

DETAILED DESCRIPTION

In the following, a detailed description will be given of an embodiment of the present disclosure with reference to the drawings.

Figure 13:
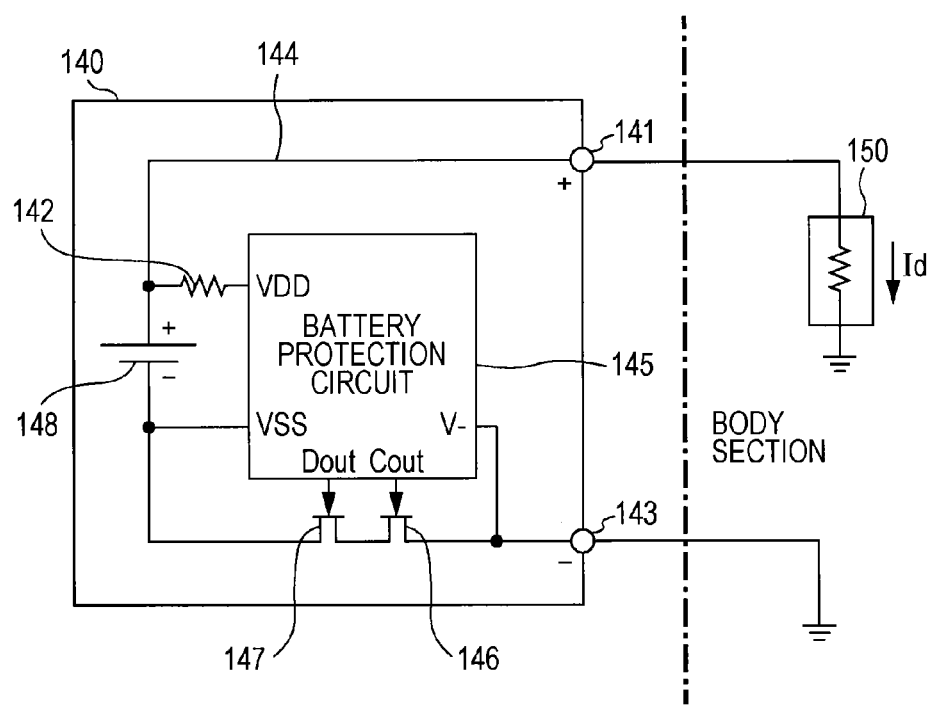
FIG. 13 is a diagram illustrating a schematic configuration of a mobile terminal including a battery device, to which an embodiment of the present disclosure is applied.

FIG. 13 illustrates a schematic configuration of a mobile terminal including a battery device 140, to which the present embodiment is applied. In this figure, a body section of the mobile terminal and the battery device 140 are conceptually simplified. The body section is a part of the mobile terminal excluding the battery device 140, and in the figure, the body section and the battery device 140 are divided by a boundary line. The battery device 140 is typically accommodated in a space in a casing of the mobile terminal.

The battery device 140 includes a battery cell 148 connected in series between a positive terminal 141 and a negative terminal 143, a field-effect transistor (FET) 147 for overdischarge/overcurrent protection, and an FET 146 for overcharge protection. The battery device 140 further includes a battery protection circuit (battery protection IC) 145 that controls the overdischarge/overcurrent protection FET 147 and the overcharge protection FET 146 (individual gate potentials). In the present embodiment, the battery protection circuit 145 is formed by an integrated circuit (IC).

A brief description will be given of protection operation of the battery device 140 including the battery protection circuit 145.

For example, the battery cell 148, such as a lithium ion battery, etc., is a battery that is vulnerable to overcharge and overdischarge, and it is not preferable that discharge occurs with a large current. Accordingly, various kinds of protection: overdischarge protection, overcurrent protection, and overcharge (overvoltage) protection, are generally performed by the battery protection circuit 145. The battery protection circuit 145 monitors a voltage of the battery cell 148 and a current flowing therethrough. If overdischarge, overcurrent, or overcharge (overvoltage) of the battery cell 148 is detected, control signals are output from output terminals Dout and Cout. These control signals control gate voltages of the protection FETs 146 and 147, which are inserted in a power source path (power source line) 144. That is to say, at the time of the occurrence of abnormality, the FETs are turned off in accordance with the control signals outputted from the output terminals Dout and Cout, and thereby the power source path 144 is cut off.

However, the battery device 140 is connected to a load device 150 at the body section side in a built-in state in the mobile terminal. In FIG. 13, for convenience, the load device 150 is conceptually denoted by one resistor. In such a configuration, even in a power-off state of the mobile terminal, if a voltage of the battery cell 148 is in a normal range, a dark current Id flows from the battery device 140 to the load device 150. For this reason, even if the mobile terminal is in the power off state, the battery cell 148 is gradually discharged.

Figure 1:
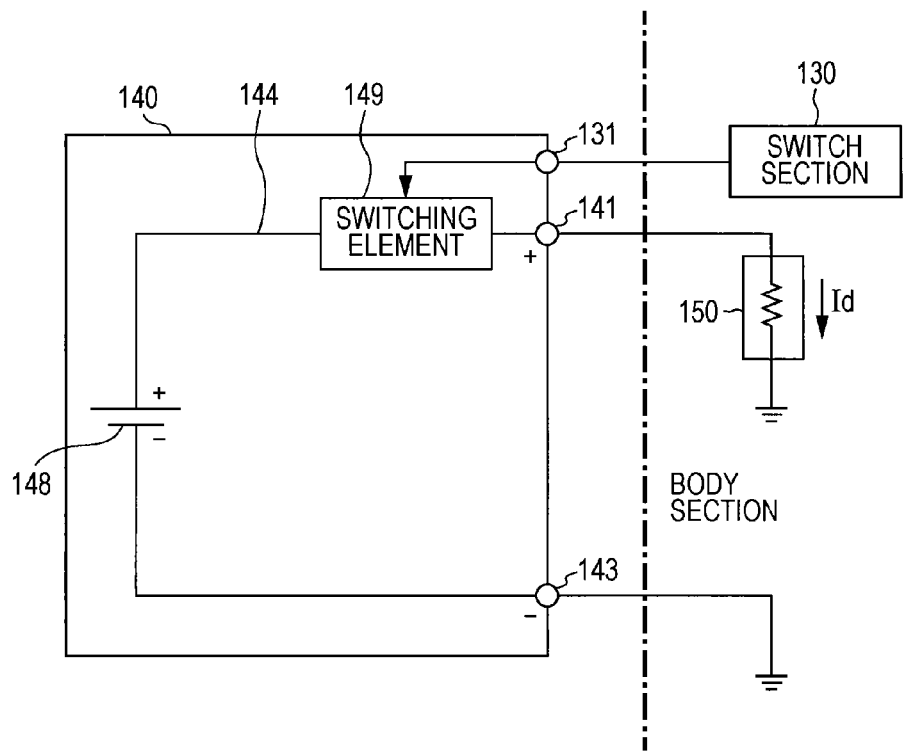
FIG. 1 is a diagram illustrating a schematic configuration of a mobile terminal including a battery device, according to an embodiment of the present disclosure.

FIG. 1 illustrates a schematic configuration of a mobile terminal 100 including the battery device 140, according to an embodiment of the present disclosure. In this figure, a same reference symbol is given to a same element as that illustrated in FIG. 13, and a duplicated description is omitted. Also, for convenience, the battery protection circuit 145 is omitted to be illustrated.

In the present embodiment, in the battery device 140, a switching element 149 that cuts off the power source path 144 is disposed in the power source path 144 (midway) supplying power to the load device 150. The switching element 149 may be an existing one in the battery device 140, or may be a newly added one. Further, a switch section 130 that controls this switching element 149 is disposed at the outside of the battery device 140. Here, the "outside" means the body section side of the mobile terminal, and a position accessible by a user. The switch section 130 generates a control signal for preventing a dark current that flows from the battery device 140 to the load device 150. By this control signal, the switching element 149 is controlled to turn on or off. That is to say, the switch section 130 is an element that turns on/off the dark-current prevention mode by directly or indirectly operated by the user.

Figure 2:
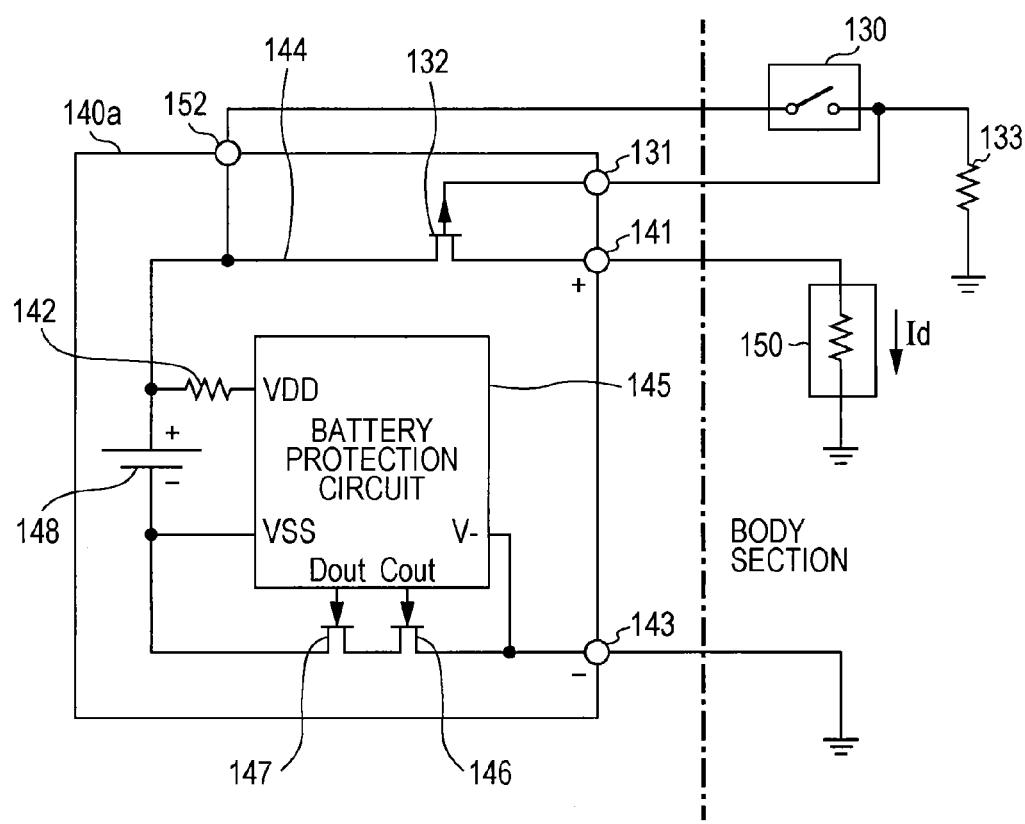
FIG. 2 is a diagram illustrating a schematic configuration of a mobile terminal including a battery device, according to a first mode of the present embodiment.

FIG. 2 illustrates a schematic configuration of a mobile terminal 100a including a battery device 140a, according to the first mode of the present embodiment. In the figure, a same reference symbol is given to a same element as that illustrated in FIG. 13 and FIG. 1, and a duplicated description is omitted.

In this mode, a field-effect transistor (FET) 132 disposed in the power source path 144 of the positive-electrode side of the battery cell 148 is used. A channel between the source and the drain of the FET 132 is inserted in the power source path 144 in series, and the gate terminal receives the control signal from the switch section 130 through a connection terminal 131 of the battery device 140a. A connection point of the connection terminal 131 and one end of the switch section 130 is connected to ground through a resistor 133. The resistor 133 has a resistance value that is sufficiently larger than a resistance value of the load 150. The other end of the switch section 130 is connected to the positive electrode of the battery cell 148 through the connection terminal 152. With this configuration, the potential of the connection terminal 131, that is to say, the gate potential of the FET 132 becomes ground potential when the switch section 130 is off, and matches the battery voltage when the switch section 130 is on.

In the dark-current prevention mode, the battery device 140a prevents a dark current from flowing to the load device 150 in accordance with the control signal from the switch section 130 in the on state. That is to say, when the switch section 130 is turned on, the battery voltage is directly applied to the gate terminal of the FET 132 through the switch section 130 so that the power source path 144 based on the FET 132 is cut off.

When the switch section 130 is turned off, the gate of the FET 132 becomes ground potential, and the FET 132 is turned on. At this time, if the battery device 140a is normal (that is to say, in a sate in which none of overdischarge, overcurrent, and overvoltage has occurred), the power source path 144 from the battery device 140a to the load device 150 becomes conductive. As a result, the mobile terminal changes from the dark-current prevention mode to a normal mode.

The switch section 130 that changes the signal applied to the gate terminal of the FET 132 can be configured using a mechanical switch or an electrical switch of the body section side. A description will be given of some specific examples of the switch section 130 later.

FIG. 3 is a diagram illustrating a summary of relationships between on/off of a dark-current prevention mode of the battery device 140a illustrated in FIG. 2 and states of individual sections.

In order to turn on the dark-current prevention mode, the switch section 130 is turned on. Thereby, the FET 132 is turned off. As a result, the power source path 144 from the battery device 140a to the load device 150 is cut off, and thus the occurrence of the dark current Id is prevented. In order to turn off the dark-current prevention mode, the switch section 130 is turned off. Thereby, the FET 132 is turned on.

By the first mode of the present embodiment illustrated in FIG. 2, at the time of factory shipment of the mobile terminal and in the case where the user leaves the mobile terminal in an unused state for along time after obtaining the mobile terminal, etc., it is possible to go into the dark-current prevention mode by operation of the switch section 130, and thereby to prevent overdischarge and deep discharge of the battery by the dark current.

Also, when the remaining amount of the battery becomes small while the user is using the mobile terminal, etc., it becomes possible to go into the dark-current prevention mode by operation of the switch section 130 in addition to turning off the power for a later use schedule without charging immediately. Thereby, it is possible to prevent the occurrence of inconvenience of unavailability of the mobile terminal at the time of turning power on again in an over-discharged state, etc., of the battery, which is caused by the dark current.

Figure 4:
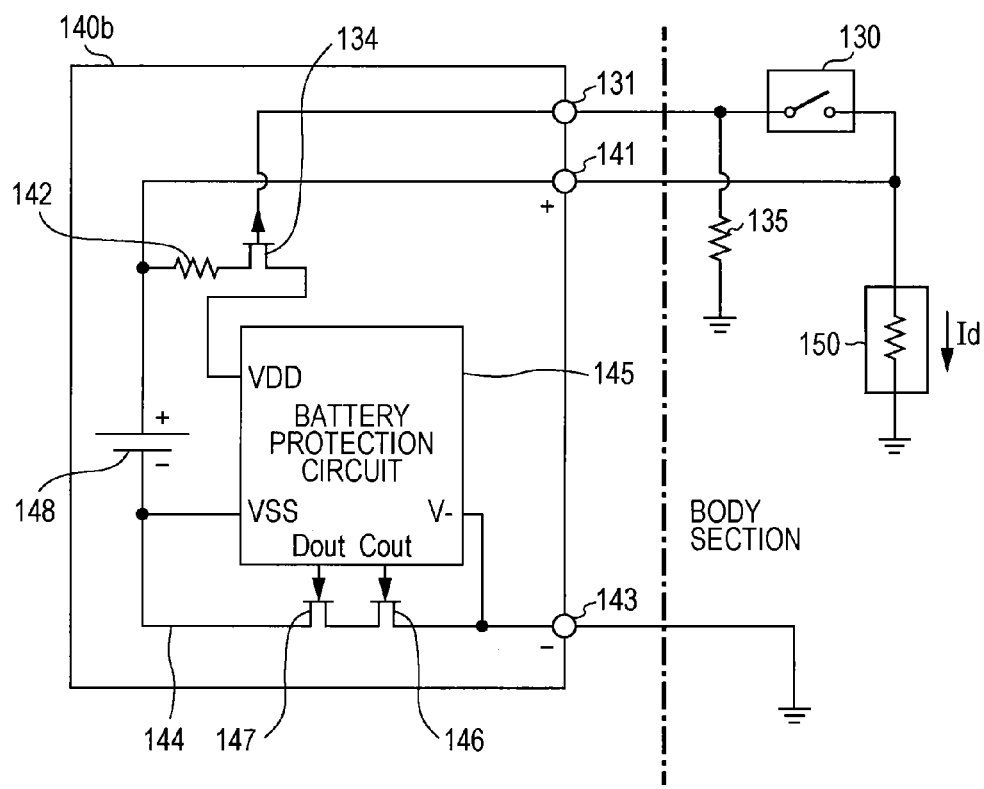
FIG. 4 is a diagram illustrating a schematic configuration of a mobile terminal including a battery device, according to a second mode of the present embodiment.

FIG. 4 illustrates a schematic configuration of a mobile terminal 100b including a battery device 140b, according to the second mode of the present embodiment. In this figure, a same reference symbol is added to a same element as that illustrated in FIG. 13 and FIG. 2, and a duplicated description is omitted.

In this mode, battery-protection FETs 146 and 147 that are disposed at the negative electrode side of the battery cell 148 are used as the switching element 149 that cuts off the power source path 144. The power source terminal VDD of the battery protection circuit 145 controlling the FETs 146 and 147 is supplied with power from the battery cell 148. In this mode, an FET 134 (second switching element) for selectively cutting off the power source voltage applied to the power source terminal VDD of the battery protection circuit 145 is disposed. A channel between the drain and the source terminals of the FET 134 is connected between a resistor 142 and the power source terminal VDD in series. The gate terminal thereof receives the control signal from the switch section 130 through the connection terminal 131 of the battery device 140b. A connection point of the connection terminal 131 and one end of the switch section 130 is connected to ground through a resistor 135. A resistance value of thee resistor 135 is sufficiently larger than a resistance value of the load 150. The other end of the switch section 130 is connected to the positive terminal 141 of the battery device 140b. With this configuration, a potential of the connection terminal 131, that is to say, the gate potential of the FET 134 becomes ground potential when the switch section 130 is off, and matches the battery voltage when the switch section 130 is on.

In the dark-current prevention mode, the FET 134 becomes off depending on the control signal from the switch section 130 in the on state. Thereby, the power of the battery protection circuit 145 is cut off, and the FETs 146 and 147 are turned off. As a result, the power source path 144 from the battery device 140b to the load device 150 is cut off.

When the switch section 130 is turned off, the FET 134 is turned on. Thereby, the power of the battery protection circuit 145 is restored, and if the battery device 140b is normal, the FETs 146 and 147 are turned on. Further, the power source path 144 from the battery device 140b to the load device 150 becomes conductive. As a result, the mobile terminal goes from the dark-current prevention mode to the normal mode.

In this regard, the switch section 130 is disposed outside the battery device 140b in the same manner as the first mode. In the second mode, the switch section 130 indirectly controls the FETs 146 and 147 as the switching element 149 through the FET 134.

FIG. 5 is a diagram illustrating a summary of relationships between on/off of a dark-current prevention mode of the battery device 140b illustrated in FIG. 4 and states of individual sections.

When the dark-current prevention mode is turned on, the switch section 130 is turned on. Thereby, the FET 134 is turned off, the power of the battery protection circuit 145 is cut off, and the FETs 146 and 147 are turned off. As a result, the power source path 144 from the battery device 140b to the load device 150 is cut off. In order to turn off the dark-current prevention mode, the switch section 130 is turned off. Thereby, the FET 134 is turned on.

By the second mode of the present embodiment illustrated in FIG. 4, the following advantage is obtained in addition to the advantages obtained by the first mode. That is to say, the FET 132 inserted in the power source path 144 in the first mode has a predetermined on resistor, and thus an impedance of power source path is increased from a related-art specification. On the other hand, in the second mode, it is not necessary to newly insert a switching element like the FET 132 in the power source path, and thus it is possible to prevent an increase in the impedance of the power source path. Thereby, it is possible to obtain reduction of power consumption and shortening of charging time.

Figure 6:
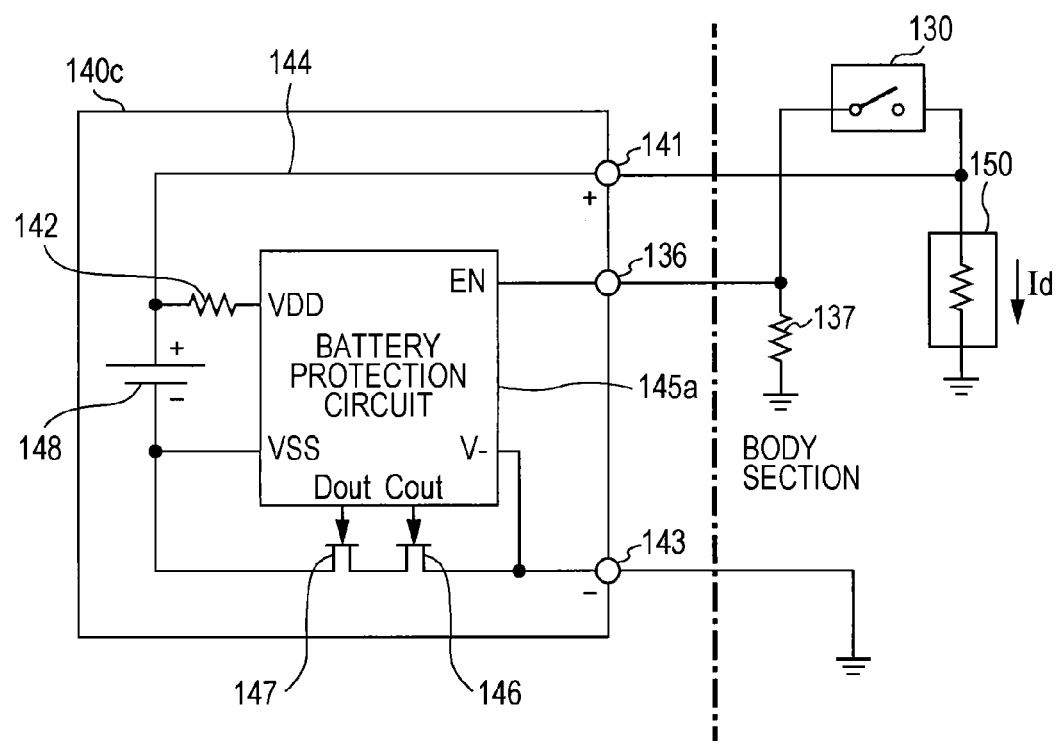
FIG. 6 is a diagram illustrating a schematic configuration of a mobile terminal including a battery device, according to a third mode of the present embodiment.

FIG. 6 illustrates a schematic configuration of a mobile terminal 100c including a battery device 140c, according to the third mode of the present embodiment. In this figure, a same reference symbol is added to a same element as that illustrated in FIG. 13 and FIG. 2, and a duplicated description is omitted.

In the third mode, at least one of the battery-protection FETs 146 and 147 is used as the switching element 149 that cuts off the power source path 144. Also, for that purpose, the battery protection circuit 145a in this mode has a control input terminal (EN) 136 that receives a control signal from the outside. This control signal is a signal for outputting an output that compulsorily cuts off the power source path 144 to at least one of the FETs 146 and 147. In this mode, a control signal from the switch section 130 is used as this control signal. A connection point of one end of the switch section 130 and the control input terminal 136 is connected to ground through a resistor 137. A resistance value of the resistor 137 is sufficiently larger than the resistance value of the load 150. The other end of the switch section 130 is connected to the positive terminal 141.

With this configuration, when the switch section 130 is turned on, the battery voltage is applied to the control input terminal 136, thereby changing to a high (Hi) state. Thereby, at least one of the FETs 146 and 147 compulsorily becomes off. As a result, the power source path 144 from the battery device 140c to the load device 150 is cut off, and thereby the occurrence of the dark current Id is prevented.

When the switch section 130 is turned off, the control input terminal 136 becomes a low (Lo) state, and if the battery device 140c is normal, both of the FETs 146 and 147 become conductive. Thereby, the power source path from the battery device 140c to the load device 150 is restored. As a result, the mobile terminal goes from the dark-current prevention mode to the normal mode.

Figure 7:
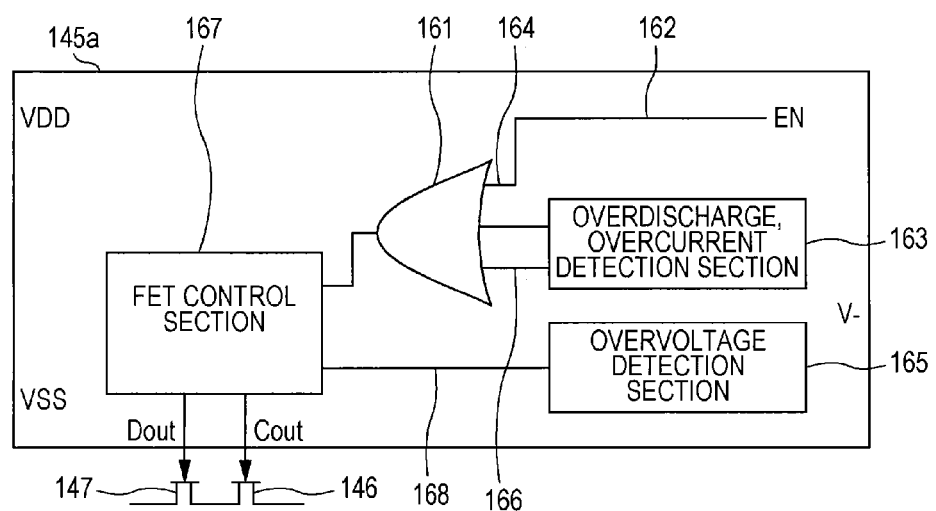
FIG. 7 is a diagram illustrating an example of a configuration of a battery protection circuit illustrated in the battery device in FIG. 6.

FIG. 7 illustrates an example of a configuration of the battery protection circuit 145a. In this example, the battery protection circuit 145a includes a logical add circuit 161, an overdischarge and overcurrent detection section 163, an overvoltage detection section 165, and an FET control section 167. A signal 162 from the control input terminal (EN) 136 is inputted into the logical add circuit 161.

The overdischarge and overcurrent detection section 163 is a block that detects overdischarge or overcurrent of the battery cell 148, and generates an overdischarge detection signal 164 and an overcurrent detection signal 166. The overvoltage detection section 165 is a block that detects overvoltage (overcharge) of the battery cell 148, and generates an overvoltage detection signal 168. The overdischarge detection signal 164 and the overcurrent detection signal 166 are inputted into the logical add circuit 161 together with the control signal 162 from the control input terminal.

The logical add circuit 161 outputs a high (Hi) signal when any one of the three input signals is high (Hi), and operates to output a low (Lo) signal in the other cases, that is to say, when all of the input signals are low (Lo). An output of the logical add circuit 161 is inputted into the FET control section 167. The overvoltage detection signal 168 generated from the overvoltage detection section 165 is also inputted into the FET control section 167. The FET control section 167 turns off the field-effect transistor (FET) 147 for overdischarge/overcurrent protection in accordance with the output of the logical add circuit 161 when the output is the high (Hi) signal indicating detection of overdischarge/overcurrent. The FET control section 167 turns off the FET 146 for overcharge protection when the detection signal 168 of the overvoltage detection section 165 is the high (Hi) signal indicating detection of overvoltage.

FIG. 8 is a diagram illustrating a summary of relationships between on/off of a dark-current prevention mode of the battery device 140c illustrated in FIG. 6 and states of individual sections.

When the dark-current prevention mode is turned on, if the switch section 130 is turned on, the control input terminal 136 of the battery protection circuit 145 becomes a high (Hi) level. Thereby, the FET 147 is turned off. As a result, the power source path 144 from the battery device 140b to the load device 150 is cut off. In order to change the dark-current prevention mode to off, the switch section 130 is turned off, and thereby the control input terminal 136 of the battery protection circuit 145 becomes the low (Lo) level. As a result, if the battery device 140c is in a normal state, the FET 147 is turned on.

By the third mode, the following advantage is obtained in addition to the advantages obtained by the first and the modes. That is to say, as the switching element 149 that is necessary for the dark-current prevention mode, the existing FET (147) for protection is shared, and thus it becomes unnecessary to dispose a switching element as the FETs 132 and 134 that are added in the first and the second modes, respectively.

Next, a description will be given of a specific example of a configuration of the switch section 130.

The switch section 130 can be configured by a mechanical switch (for example, a slide switch or a push switch) disposed on the outer surface of the casing of the mobile terminal for setting the dark-current prevention mode. Alternatively, when the user has selected the dark-current prevention mode from an initial setting screen, etc., it is possible for a processor (not illustrated in the figure) possessed by the mobile terminal to generate output equivalent to the output of the switch section 130, etc.

Further, it is possible for the switch section 130 to employ the following characteristic configuration. A mobile terminal, such as an existing mobile telephone, uses a detachable card medium, such as a SIM (Subscriber Identity Module) card. This card medium is detachably attached to a socket, which is a kind of a connector. That is to say, the socket constitutes a receiving section to which a card medium, which is a removable member, is detachably attached. A SIM card is not attached to a mobile terminal at the time of factory shipment of the mobile terminal like thisUsually, a SIM card is attached after the user obtains the mobile terminal. Accordingly, if attachment of a SIM card to a mobile terminal is linked with operation of the switch section 130, it is possible for the user to perform on/off operation of the dark-current prevention mode without being aware of the operation of the switch section 130. However, a part of the functions of the mobile terminal is sometimes available in a state in which the SIM card is not attached, and thus it is not preferable to go into the dark-current prevention mode immediately in the sate of the SIM card not attached.

Thus, a dummy SIM card (dummy card) in place of the SIM card is prepared. The switch section 130 becomes the on state in a state of the dummy card attached to the mobile terminal in place of the SIM card, and the mobile terminal goes to the dark-current prevention mode. Also, when the dummy card is detached, the dark-current prevention mode is released (turned off).

Figure 9A:
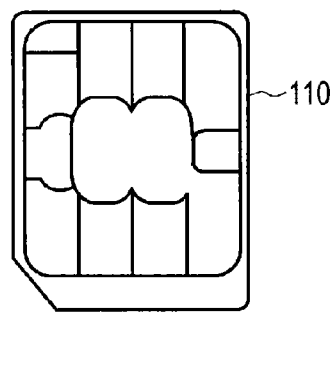
FIGS. 9A, 9B, and 9C are diagrams for explaining an example of a first configuration of a switch section operated in conjunction with attachment and detachment of a dummy SIM card.
Figure 9B:
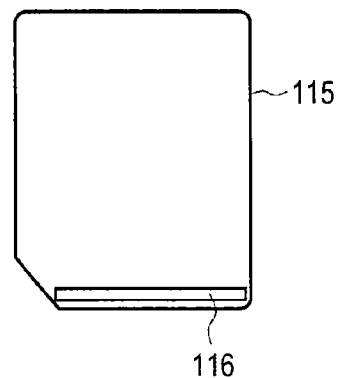

Using FIGS. 9A, 9B and 9C, a description will be given of an example of a first configuration of the switch section 130 that is operated in conjunction with attachment and detachment operation of the dummy SIM card as such a movable member. FIG. 9A illustrates an outer view of an existing SIM card 110. The SIM card 110 is a kind of IC card, and a plurality of contact areas are formed on one surface thereof. FIG. 9B illustrates an outer view of a dummy card 115 in the present embodiment. The dummy card 115 is a card medium having a same shape and size as the SIM card 110, but includes a conductive area 116 in an area different from the contact areas of the SIM card 110. The conductive area 116 can be formed on an insulating base by metal plating or coating, etc., for example. The dummy card 115 is not necessarily an IC card.

Figure 9C:
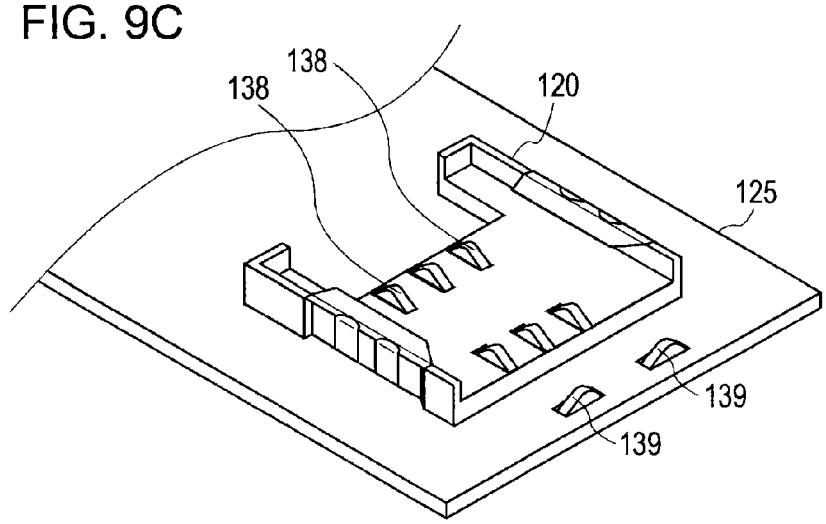

FIG. 9C illustrates an outer view of a socket 120 to which the SIM card 110 is attached. The socket 120 has a plurality of spring contacts 138 with which the contact areas of the SIM card 110 makes contact, and is mounted on the printed circuit board 125 in the mobile terminal. On the printed circuit board 125, a pair of spring contacts 139 with which the conductive area 116 of the dummy card 115 comes in contact in a state of the dummy card 115 attached to the socket 120 is formed. Thereby, attachment of the dummy card 115 causes short circuit between both of the spring contacts 139. This means that the switch section 130 is constituted by the dummy card 115 and a pair of the spring contacts 139.

For example, the dummy card 115 is attached to the socket 120 at the time of factory shipment of the mobile terminal so that the dark-current prevention mode becomes the on state. After a user obtains this mobile terminal, when the user removes the dummy card 115, the dark-current prevention mode becomes the off state. After that, even if a regular SIM card 110 is attached to the socket 120 in place of the dummy card 115, the dark-current prevention mode remains the off state. If the dummy card 115 is attached to the socket 120 again, the mobile terminal goes to the dark-current prevention mode again.

Using FIGS. 10A, 10B and 10C, a description will be given of an example of a second configuration of the switch section 130 that is operated in conjunction with attachment and detachment operation of the dummy SIM card as a movable member. A same reference numeral is given to a same element as that illustrated in FIGS. 9A, 9B and 9C, and duplicated descriptions will be omitted.

Figure 10A:
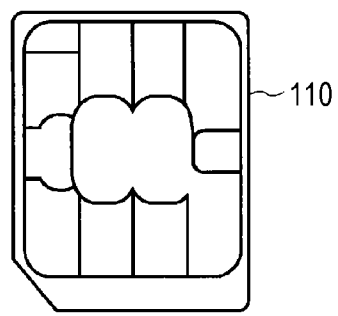
FIGS. 10A, 10B, and 10C are diagrams for explaining an example of a second configuration of a switch section operated in conjunction with attachment and detachment of a dummy SIM card.
Figure 10B:
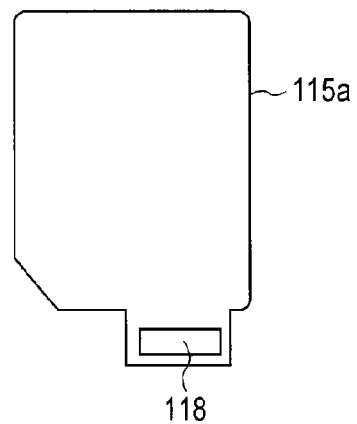
Figure 10C:
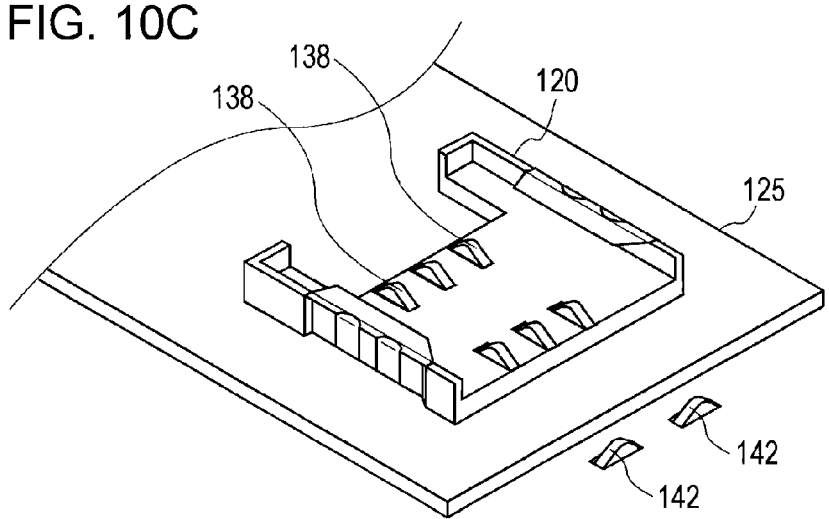

In this example of the configuration, a dummy card 115a having a slightly different shape as the SIM card 110 illustrated in FIG. 10A is prepared. The dummy card 115a is provided with a protrusion 117 that is protruding at an end at near side in a state attached to the socket 120, and a conductive area 118 is formed here. On the socket 120 side, a pair of spring contact 139 is disposed at the outside of the printed circuit board 125. The conductive area 118 formed on the protrusion 117 of the dummy card 115a causes short circuit between both of the spring contacts 139. In place of this configuration, a similar protrusion may be disposed on the printed circuit board 125, and the spring contacts 139 may be disposed on the protrusion of the printed circuit board 125.

Also, in place of the spring contact 139, a switch operated by external force (for example, a push switch), etc., may be disposed. In this case, in a state of the dummy card 115a attached to the socket 120, the protrusion 117 of the dummy card 115a functions so as to operate (ON) the switch as a drive section.

For an example of a card medium as a kind of movable member, a SIM card has been given, but a memory card, such as an SD memory, etc., may be used.

Using FIGS. 11A and 11B, a description will be given of an example of a third configuration of the switch section 130 that is operated in conjunction with attachment and detachment of a dummy earphone plug as a movable member.

Figure 11A:
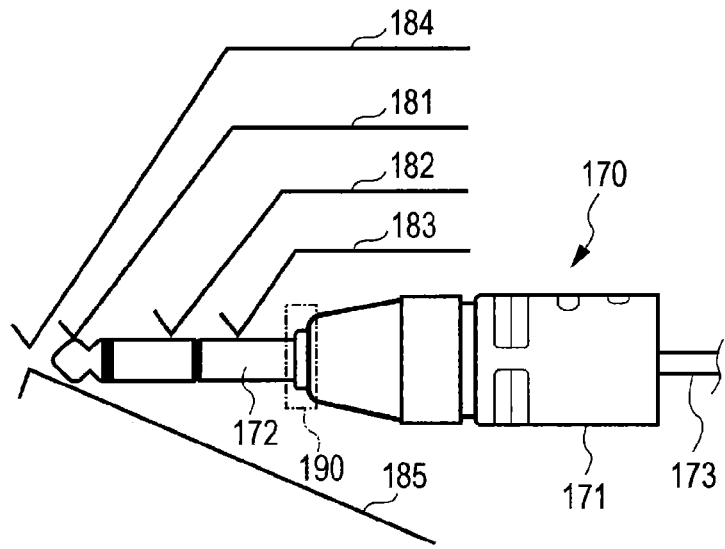
FIGS. 11A and 11B are diagrams for explaining an example of a third configuration of a switch section operated in conjunction with attachment and detachment of a dummy earphone plug.

FIG. 11A illustrates existing examples of configurations of an earphone plug 170 and a jack (receptacle) to which this earphone plug 170 is connected.

The earphone plug 170 has a trunk section 171 and a pin section 172 protruding from the trunk section 171. The trunk section 171 is connected to an ear receiver section (speaker section) not illustrated in the figure through a cable 173.

Figure 11B:
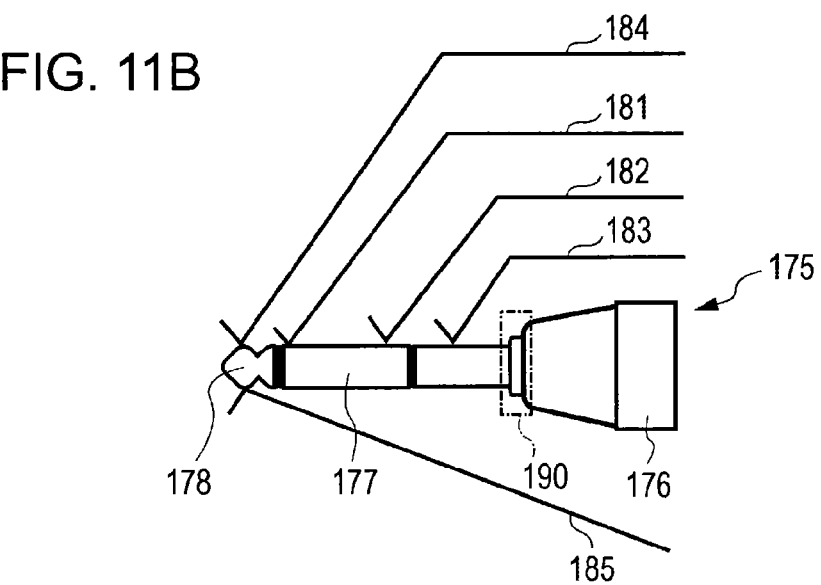

FIGS. 11A and 11B schematically illustrate states in which a plurality of spring contacts 181 to 185 are disposed at the back of a plug insertion opening 190 of the jack. Spring contacts 181 to 183 among spring contacts 181 to 185 are included in an existing jack configuration for stereo sound. The spring contacts 184, 185, which are the first and the second contacts (a pair of contacts), are disposed at an innermost section, and thus an end section of the pin section 172 having a predetermined length of the earphone plug 170 does not reach the spring contacts 184, 185.

As illustrated in FIG. 11B, a dummy plug 175 has a trunk section 176 that is shorter than the regular plug 170 and a pin section 177 that is longer. When the dummy plug 175 is attached, an end section 178 of the pin section 177 reaches at positions of the spring contacts 184, 185, and causes both of the spring contacts 184, 185 to short circuit. In this manner, the dummy plug 175 and the spring contacts 184, 185 constitute the switch section 130. The dummy plug 175 does not need the cable 173. The pin section 172 is divided into a plurality of conductive sections, but the pin section 177 of the dummy plug 175 may be a single conductive section overall. Also, only the end section of the pin section 177, which makes contact with the spring contact 184, 185 is a conductive section, and the other sections may be insulating sections.

For example, the dummy plug 175 is attached to the jack at the time of factory shipment of the mobile terminal so that the dark-current prevention mode becomes the on state. After the user obtains this mobile terminal, when the dummy plug 175 is removed, the dark-current prevention mode becomes the off sate. After that, even if the user attaches the regular earphone plug 170 to the jack, the dark-current prevention mode remains the off state.

Figure 12A:
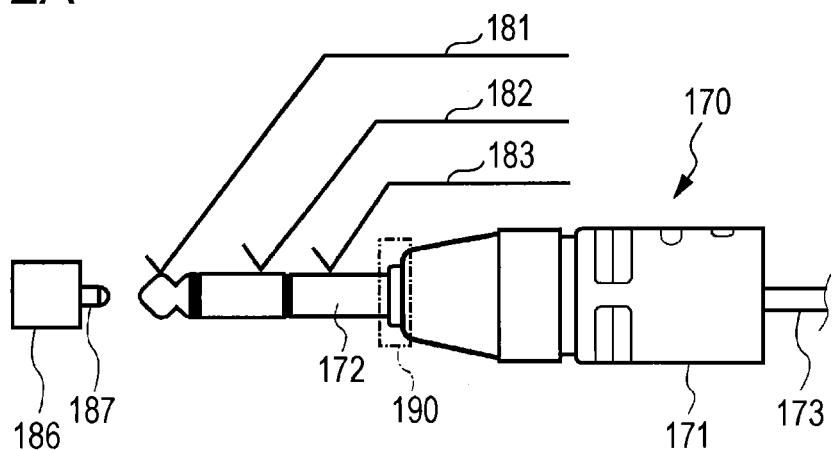
FIGS. 12A and 12B are diagrams for explaining an example of closing a path in the third configuration.
Figure 12B:
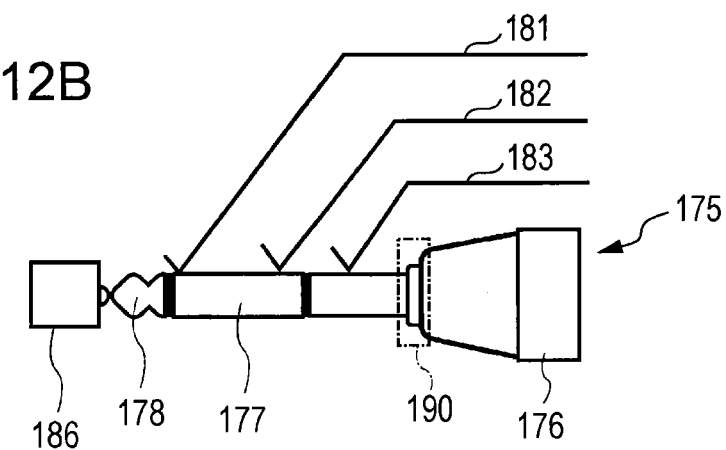

Using FIGS. 12A and 12B, a description will be given of a variation of the example of the third configuration. In this variation, in place of causing electrical short circuit between the first and the second contacts, a mechanical switch 186, such as a push switch, is disposed at the inner part of the jack as the switch section 130. As illustrated in FIG. 12A, an end of the pin 172 of the regular earphone plug 170 does not reach the mechanical switch 186, and thus the mechanical switch 186 remains off. As illustrated in FIG. 12B, when the dummy plug 175 is attached, an end 178 of the pin 177 reaches the mechanical switch 186. As a result, the dummy plug 175 pushes the push button 187 so that the mechanical switch 186 turns on (becomes conductive). When the dummy plug 175 is pulled out, the mechanical switch 186 turns off. In the case of this variation, the end of the pin section of the dummy plug is not necessarily a conductor.

As described above, it is possible to add a slight change to a movable member that is detachable, and a receiving section thereof, which is originally included in a mobile terminal, and to use them as the switch section. Thereby, it is possible for the user to turn on and off the dark-current prevention mode in conjunction with attachment and detachment operation of the dummy movable member.

With this configuration, it becomes unnecessary to dispose a new switch section for user operation on the outside of the casing of the mobile terminal. This contributes reduction of the mobile terminal in size, in thickness, and in cost. In a mobile terminal having a waterproof structure, if a new switch section is disposed on the outside of the casing, it becomes necessary to have a new waterproof structure as a result. In contrast, an existing movable member and a receiving section thereof is used as the switch section so that such consideration becomes unnecessary.

In the above, in an embodiment of the present disclosure, a description has been given of:

(1) An information processing apparatus comprising: an internal battery device including a secondary battery; a load device configured to receive power from the secondary battery; a switch section disposed externally to the battery device and configured to generate a control signal for preventing dark current from flowing from the secondary battery to the load device; and a first switching element configured to cut off a power source path from the secondary battery to the load device based on the control signal generated by the switch section.

(2) The information processing apparatus of (1), wherein the switching element includes a field-effect transistor (FET).

(3) The information processing apparatus of (2), wherein a channel between a source terminal and a drain terminal of the FET is disposed in series in the power source path from the secondary battery to the load device.

(4) The information processing apparatus of (3), wherein a gate terminal of the FET is connected to an output of the switch section and receives the control signal from the switch section.

(5) The information processing apparatus of (1), wherein the internal battery device includes a battery protection circuit; a second switching element connected to a first output terminal of the protection circuit and disposed in the power source path from the secondary battery to the load device; and a third switching element connected to a second output terminal of the protection circuit and disposed in the power source path from the secondary battery to the load device.

(6) The information processing apparatus of (1), wherein the internal battery device includes a battery protection circuit including an input terminal and an output terminal; and a second switching element connected to the output terminal of the protection circuit and disposed in the power source path from the secondary battery to the load device, the second switching element configured to cut off a power source path from the secondary battery to the load device based on an output of the output terminal of the battery protection circuit.

(7) The information processing apparatus of (6), wherein the first switching element is disposed in series between the control input terminal of the battery protection circuit and the power source path from the secondary battery to the load device.

(8) The information processing apparatus of (7), wherein a signal output by the output terminal of the battery protection circuit to the second switching element is controlled based on a status of the first switching element.

(9) The information processing apparatus of (6), wherein the battery protection circuit includes at least one of an overcharge detector, an overcurrent detector and an overvoltage detector and the input terminal is connected to an output of the switch section.

(10) The information processing apparatus of (9), wherein a signal output by the output terminal is controlled by logically adding the output of the switch section with an output of the at least one of the overcharge detector, the overcurrent detector and the overvoltage detector.

(11) The information processing apparatus of (1), further comprising: a receiving section configured to detachably receive a movable member, wherein the switch section includes a switch disposed on or within the receiving section, which becomes conductive when the movable member is received by the receiving section.

(12) The information processing apparatus of (11), wherein the movable member is a card medium.

(13) The information processing apparatus of (11), wherein the movable member is an earphone plug.

(14) The information processing apparatus of (11), wherein the switch disposed in the receiving section includes a first contact and a second contact.

(15) The information processing apparatus of (14), wherein the movable member includes a conductive portion that causes the first and second contacts to be short-circuited when the movable member is received by the receiving section.

(16) The information processing apparatus of (11), wherein the switch disposed in the receiving section includes a mechanical switch that is either actuated or made conductive based on an external force applied by the movable member.

In the above, description has been given of the preferred embodiment of the present disclosure. However, it is possible to make various alterations and changes in addition to the above descriptions. That is to say, it is understood by those skilled in the art that various alterations, combinations, and the other embodiments may occur depending on design requirements or the other factors as long as they are within the scope of the appended claim or the equivalents thereof as a matter of course.

For example, it is possible to use a USB device as the movable member in addition to the above. Also, it is possible to provide the body section with a receiving section on which a mechanical switch or a pair of contacts is disposed, and to configure a switch section that becomes on by inserting a movable member, such as a metallic or plastic pin into the receiving section. A smart phone has been given as a mobile terminal, but a mobile terminal to which the present disclosure is applied is not limited to a smart phone. The mobile terminal may include any electronic device having an internal battery device including a secondary battery. For example, a mobile telephone terminal, a mobile information terminal, a small-sized PC, a mobile game machine, a mobile music and video player, a mobile electronic dictionary, etc., are given.

The invention claimed is:

1. An information processing apparatus comprising:
an internal battery device including a secondary battery;
a load device configured to receive power from the secondary battery;
a receiving section configured to detachably receive a movable member;
circuitry configured to generate a control signal for preventing dark current from flowing from the secondary battery to the load device; and
a first switching element configured to cut off a power source path from the secondary battery to the load device based on the control signal generated by the circuitry, wherein
the circuitry includes a switch disposed on or within the receiving section, which becomes conductive when the movable member is received by the receiving section.

2. The information processing apparatus of claim 1, wherein
the switching element includes a field-effect transistor (FET).

3. The information processing apparatus of claim 2, wherein
a channel between a source terminal and a drain terminal of the FET is disposed in series in the power source path from the secondary battery to the load device.

4. The information processing apparatus of claim 3, wherein
a gate terminal of the FET is connected to an output of the circuitry and receives the control signal from the circuitry.

5. The information processing apparatus of claim 1, wherein
the internal battery device includes
a battery protection circuit;
a second switching element connected to a first output terminal of the protection circuit and disposed in the power source path from the secondary battery to the load device; and
a third switching element connected to a second output terminal of the protection circuit and disposed in the power source path from the secondary battery to the load device.

6. The information processing apparatus of claim 1, wherein
the internal battery device includes
a battery protection circuit including an input terminal and an output terminal; and
a second switching element connected to the output terminal of the protection circuit and disposed in the power source path from the secondary battery to the load device, the second switching element configured to cut off a power source path from the secondary battery to the load device based on an output of the output terminal of the battery protection circuit.

7. The information processing apparatus of claim 6, wherein
the first switching element is disposed in series between the input terminal of the battery protection circuit and the power source path from the secondary battery to the load device.

8. The information processing apparatus of claim 7, wherein
a signal output by the output terminal of the battery protection circuit to the second switching element is controlled based on a status of the first switching element.

9. The information processing apparatus of claim 6, wherein
the battery protection circuit includes at least one of an overcharge detector, an overcurrent detector and an overvoltage detector and the input terminal is connected to an output of the circuitry.

10. The information processing apparatus of claim 9, wherein a signal output by the output terminal is controlled by logically adding the output of the circuitry with an output of the at least one of the overcharge detector, the overcurrent detector and the overvoltage detector.

11. The information processing apparatus of claim 1, wherein
the movable member is a card medium.

12. The information processing apparatus of claim 1, wherein
the movable member is an earphone plug.

13. The information processing apparatus of claim 1, wherein
the switch disposed in the receiving section includes a first contact and a second contact.

14. The information processing apparatus of claim 13, wherein
the movable member includes a conductive portion that causes the first and second contacts to be short-circuited when the movable member is received by the receiving section.

15. The information processing apparatus of claim 1, wherein
the switch disposed in the receiving section includes a mechanical switch that is either actuated or made conductive based on an external force applied by the movable member.

16. An information processing apparatus comprising:
a battery;
a load configured to receive power from the battery;
an interface configured to detachably receive a movable member; and
circuitry configured to generate a signal for preventing dark current from flowing from the battery to the load when the movable member is received by the interface; and
a switching element configured to cut off a power source path from the battery to the load based on the signal generated by the circuitry.

17. An information processing apparatus comprising:
a battery;
a load configured to receive power from the battery;
an interface configured to detachably receive a movable member; and
circuitry disposed on or within the housing which becomes conductive when the movable member is received by the interface; and
a switching element configured to cut off a power source path from the battery to the load device when the circuitry is conductive.

* * * * *